(12) United States Patent
Wilson et al.

(10) Patent No.: US 11,888,690 B2
(45) Date of Patent: Jan. 30, 2024

(54) SYSTEM AND METHOD FOR SUBSCRIPTION LIMITATION ENFORCEMENT IN DISTRIBUTED SYSTEM

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 17/570,604

(22) Filed: Jan. 7, 2022

(65) Prior Publication Data

US 2023/0224216 A1 Jul. 13, 2023

(51) Int. Cl.
*H04L 41/082* (2022.01)
*H04L 67/30* (2022.01)

(52) U.S. Cl.
CPC ............ *H04L 41/082* (2013.01); *H04L 67/30* (2013.01)

(58) Field of Classification Search
CPC ............................... H04L 41/082; H04L 67/30
See application file for complete search history.

(56) References Cited

U.S. PATENT DOCUMENTS

| | | | | |
|---|---|---|---|---|
| 6,317,815 B1 * | 11/2001 | Mayer | ................... | G06F 3/0689 711/165 |
| 6,421,727 B1 * | 7/2002 | Reifer | ................ | H04B 7/18589 709/225 |
| 7,464,163 B1 | 12/2008 | Bantz et al. | | |
| 9,178,948 B2 * | 11/2015 | Chen | ..................... | H04L 67/566 |
| 9,705,995 B2 * | 7/2017 | Edlund | ................... | H04L 67/51 |
| 10,044,522 B1 | 8/2018 | Shamis et al. | | |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Ario Etienne
*Assistant Examiner* — Kidest Mendaye
(74) *Attorney, Agent, or Firm* — Womble Bond Dickinson (US) LLP

(57) ABSTRACT

Methods, systems, and devices for providing for providing computer implemented services using managed systems are disclosed. To improve the likelihood of the computer implemented services being provided, a subscription based model may be used to manage the managed systems. The subscription based model may provide for automatic configuration of and software deployment to any number of managed systems to provide subscribed to solutions to various users. Over time, the solutions desired by users may change. The subscription based model may facilitate automatic disablement of existing solutions thereby allowing users to only receive subscribed to solutions using managed systems. To provide for continuity of solutions, the automated disablement may take into account data compatibility, and may proactively reformat or otherwise modify data to reduce data incompatibility. Consequently, users of the solutions may be provided with a continuous experience through solution data retention.

19 Claims, 10 Drawing Sheets

(56) References Cited

U.S. PATENT DOCUMENTS

| | | | |
|---|---|---|---|
| 11,588,909 | B1 | 2/2023 | Wilson et al. |
| 11,632,315 | B1 | 4/2023 | Sawal et al. |
| 11,671,379 | B1 | 6/2023 | Wilson et al. |
| 11,803,667 | B2 | 10/2023 | Singh et al. |
| 2003/0131028 | A1 | 7/2003 | Radi et al. |
| 2005/0182843 | A1 | 8/2005 | Reistad et al. |
| 2006/0010477 | A1 | 1/2006 | Yu |
| 2006/0136747 | A1 | 6/2006 | Ahdout et al. |
| 2007/0214193 | A1 | 9/2007 | Takahashi et al. |
| 2008/0235784 | A1 | 9/2008 | Basner et al. |
| 2008/0256641 | A1 | 10/2008 | Lo |
| 2012/0005649 | A1 | 1/2012 | Lavin |
| 2012/0042388 | A1 | 2/2012 | Rive et al. |
| 2012/0144177 | A1 | 6/2012 | Tyigun et al. |
| 2012/0311673 | A1 | 12/2012 | Sodah |
| 2013/0198346 | A1 | 8/2013 | Jubran et al. |
| 2013/0339306 | A1 | 12/2013 | Kim et al. |
| 2014/0074793 | A1* | 3/2014 | Doering ............... G06F 16/113 707/667 |
| 2015/0005033 | A1 | 1/2015 | Petersson et al. |
| 2015/0271276 | A1 | 9/2015 | Edlund et al. |
| 2015/0278323 | A1* | 10/2015 | Melahn ............... G06F 16/178 707/610 |
| 2015/0373012 | A1 | 12/2015 | Bartz |
| 2016/0150396 | A1 | 5/2016 | Milhizer |
| 2016/0188868 | A1 | 6/2016 | Otturu et al. |
| 2017/0006119 | A1 | 1/2017 | Pogrebinsky et al. |
| 2017/0048713 | A1 | 2/2017 | Guday et al. |
| 2017/0090912 | A1* | 3/2017 | Fuglsang ............... G06F 8/30 |
| 2017/0244783 | A1 | 8/2017 | Maresca |
| 2017/0359356 | A1* | 12/2017 | Brandwine ............ H04L 63/08 |
| 2021/0067406 | A1* | 3/2021 | Myers ................. G06F 11/3409 |
| 2021/0160255 | A1* | 5/2021 | Cherkas ................. H04L 67/30 |
| 2021/0360074 | A1 | 11/2021 | Long |
| 2022/0164838 | A1 | 5/2022 | Wang |
| 2022/0200928 | A1 | 6/2022 | Garrison et al. |
| 2023/0171586 | A1 | 6/2023 | Holmes |
| 2023/0221784 | A1 | 7/2023 | Wilson et al. |
| 2023/0221997 | A1 | 7/2023 | Wilson et al. |
| 2023/0222080 | A1 | 7/2023 | Wilson et al. |
| 2023/0222468 | A1 | 7/2023 | Wilson et al. |
| 2023/0222469 | A1 | 7/2023 | Wilson et al. |
| 2023/0222470 | A1 | 7/2023 | Wilson et al. |
| 2023/0222471 | A1 | 7/2023 | Wilson et al. |
| 2023/0229512 | A1 | 7/2023 | Sawal et al. |
| 2023/0229516 | A1 | 7/2023 | Sawal et al. |
| 2023/0229818 | A1 | 7/2023 | Sawal et al. |
| 2023/0232549 | A1 | 7/2023 | Sawal et al. |
| 2023/0342787 | A1 | 10/2023 | Mohanty et al. |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

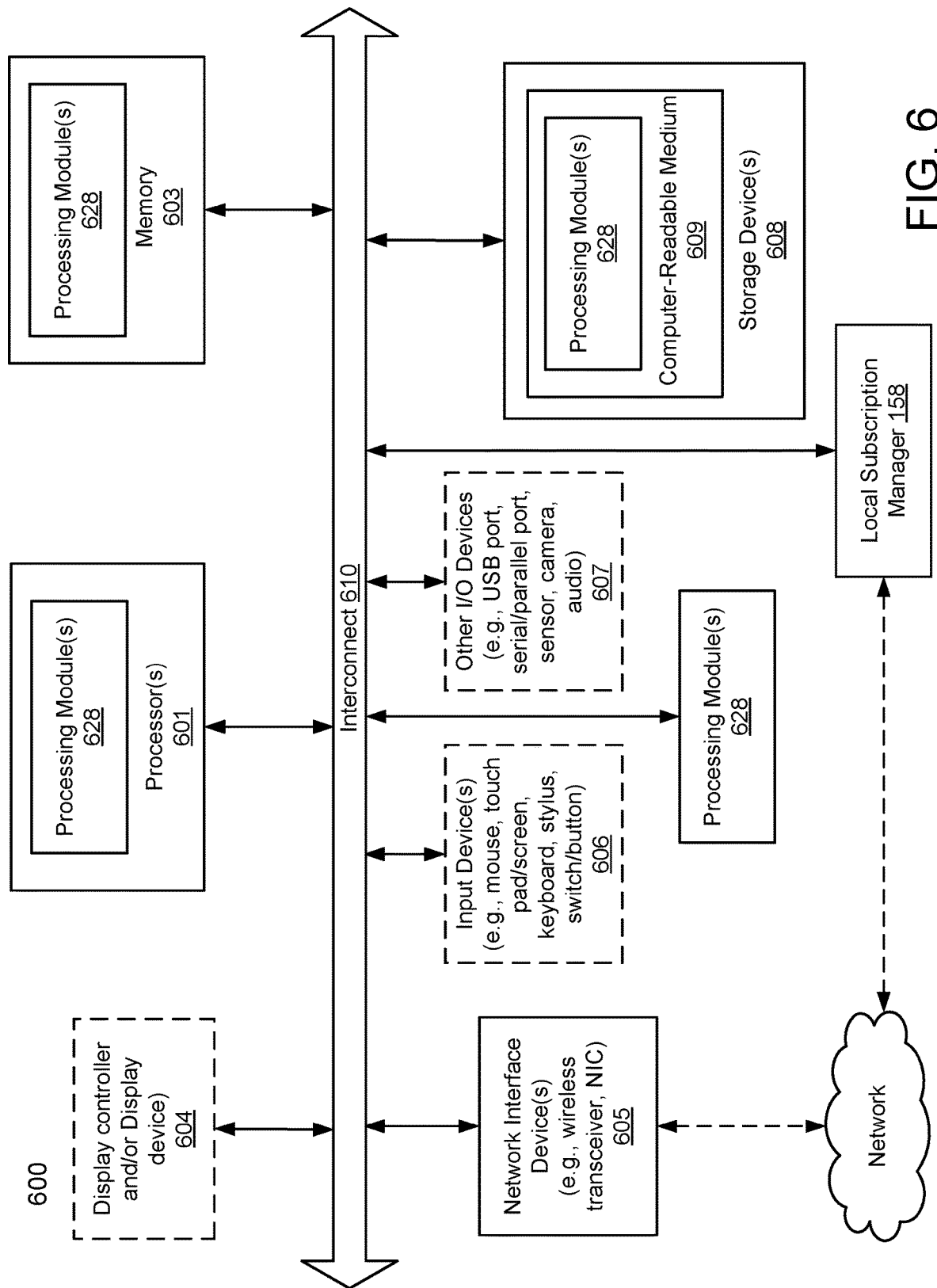

SYSTEM AND METHOD FOR SUBSCRIPTION LIMITATION ENFORCEMENT IN DISTRIBUTED SYSTEM

FIELD DISCLOSED HEREIN

Embodiments disclosed herein relate generally to system management. More particularly, embodiments disclosed herein relate to systems and methods to enforced solution limitations on deployed solutions.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 6 shows a block diagram illustrating a computing device in accordance with an embodiment.

DETAILED DESCRIPTION

Figure 1A:
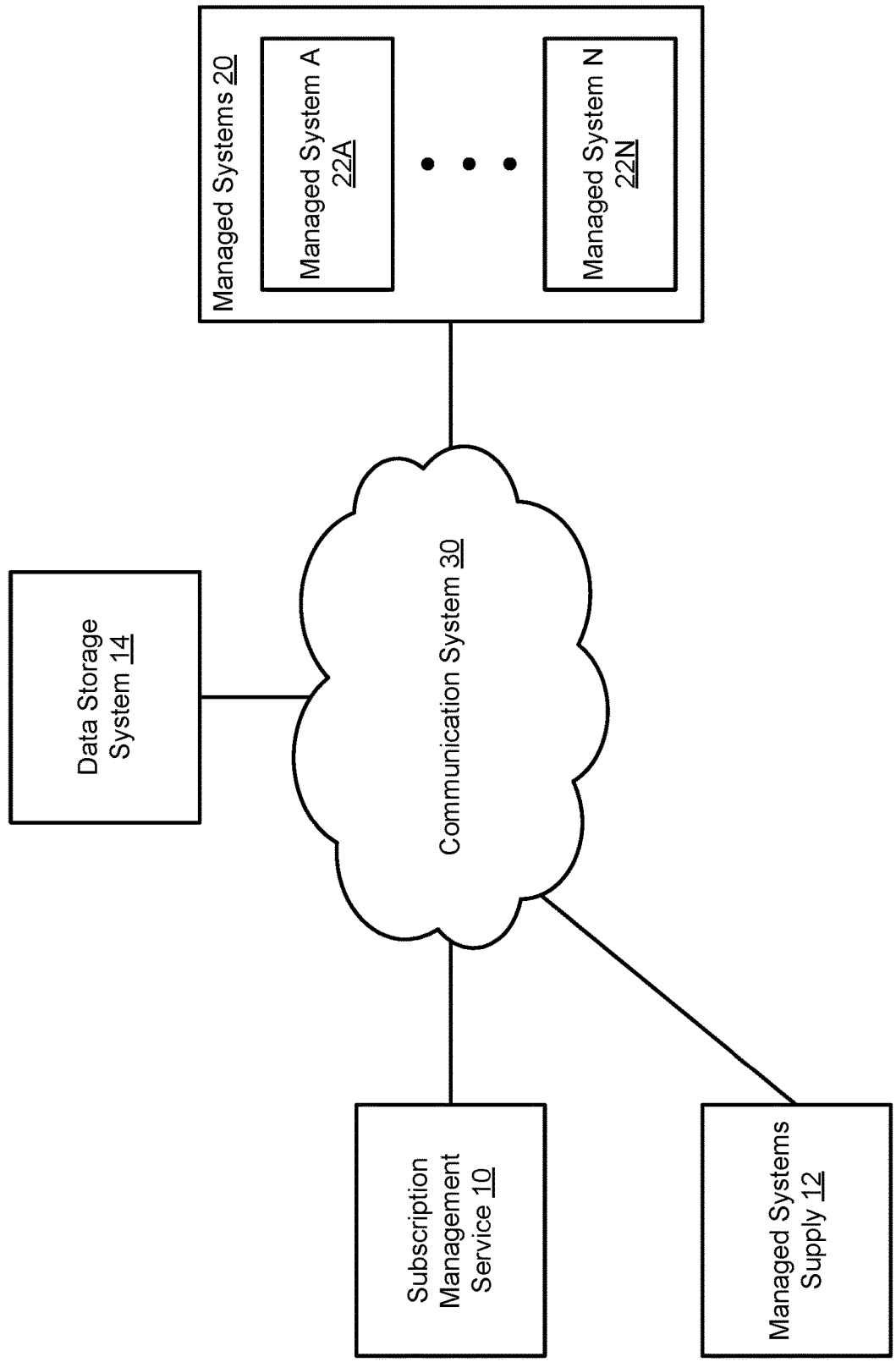
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology. Additionally, references to "a message" or "messages" should be understood to indicate that any number of messages may be used to transmit information. A message may correspond to any type of data unit implemented by one or more communication protocols.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To facilitate use of solutions, embodiments disclosed herein may utilize a subscription based model for managing various managed systems that may provide all, or a portion, of the solutions. The subscription based model may provide for automatic configuration of and software deployment to any number of managed systems to provide subscribed to solutions to various users.

Over time, the solutions desired by users may change. For example, users may elect not to maintain various subscriptions. The subscription based model may facilitate automatic disablement of existing solutions thereby allowing users to only receive subscribed to solutions using managed systems. To provide for continuity of solutions, the automated disablement may take into account data compatibility, and may proactively reformat or otherwise modify data to reduce data incompatibility. Consequently, users of the solutions (even after termination) may be provided with a continuous experience through which previously utilized solution data (e.g., generated with or otherwise used by provided solutions) may be retained and used after solution changes have been implemented.

In an embodiment, a computer-implemented method for providing a solution using managed systems is provided. The method may include identifying, by a local subscription manager hosted by a managed system of the managed systems, a subscription termination event for the managed system, the subscription termination event indicating that the managed system is no longer subscribed to the solution; based on the identification: performing, by the local subscription manager, one or more subscription disablement actions, the performance of the one or more subscription disablement actions enforcing an operating state on the managed system in which the solution is not performable; deregistering, by the local subscription manager, one or more subscriptions associated with the managed system both locally and remotely with a subscription management services that manages the managed system; and providing, by the managed system, computer implemented services that are unable to provide the solution.

Identifying the subscription termination event may include monitoring operation of the managed system; making a comparison between the operation of the managed system and a subscription limitation of a subscription for the solution; and making a determination, based on the comparison, that the subscription limitation has been exceeded.

The comparison may be made using a locally maintained copy of the subscription limitation in a storage of the local subscription manager.

Performing the one or more subscription disablement actions may include retrieving, from the storage of the local subscription manager, a code block associated with the subscription limitation; and initiating execution of the code block by a processor of the managed system. Executing the code block may cause the processor to initiate replacement of a startup manager of the managed system with a second startup manager, the second startup manager not being associated with the solution. The startup manager may be replaced by reconfiguring the startup manager, the reconfigured startup manager being the second startup manager.

The second startup manager may be adapted to display an indication to a user of the managed system that the managed system is unable to provide the solution, the display being associated with a modified personality of the startup manager.

Executing the code block may further cause the processor to initiate replacement of an operation manager of the managed system with a second operation manager, the second operation manager not being associated with the solution, and operational management of the managed system being handed off to the second operation manager following startups managed by the second startup manager.

Performing the one or more subscription disablement actions may include making a determination that a portion of solution data stored in a storage device of the managed system subject to a retention requirement; based on determination, storing a copy of the portion of solution data in a retention area; and after storing the copy, reformatting the storage device of the managed system, the portion of the solution data being deleted from the reformatted storage device.

The computer-implemented method may also include, prior to performing the computer implemented services: installing, with the reformatted storage disk, at least one of a startup manager, an operation manager, and a software stack for the managed system; and importing the portion of the solution data from the retention area for use with the computer implemented services.

Importing the portion of the solution data may include identifying a destination format compatible with the at least one of the startup manager, the operation manager, and the software stack; storing a format modified copy of the portion of the solution data in the storage device based on the destination format; and initiating use of the format modified copy of the portion of the solution data by the at least one of the startup manager, the operation manager, and the software stack.

The local subscription manager may include a computing device hosted by the managed system and that operates independently from the managed system, the local subscription manager being operably connected to a processor of the managed system used to provide the computer implemented services and the storage device.

In an embodiment, a non-transitory media is provided that may include instructions that when executed by a processor cause the computer-implemented method to be performed.

In an embodiment, a managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20 to facilitate provisioning of one or more solutions to users of managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). Any of the hardware components and/or software components may be subject to configuration that may allow for modification of their operation to various operating states.

The aggregate operation of all, or a portion, of the hardware components and software components of one or more managed systems may give rise to an integrated solution, platform, service, etc. able to provide desired computer implemented services (e.g., to users of managed systems 20 and/or other devices operably connected to managed systems 20). Changes in the hardware and/or software components of managed system may provide for various types of different computer implemented services and corresponding solutions to be provided over time.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
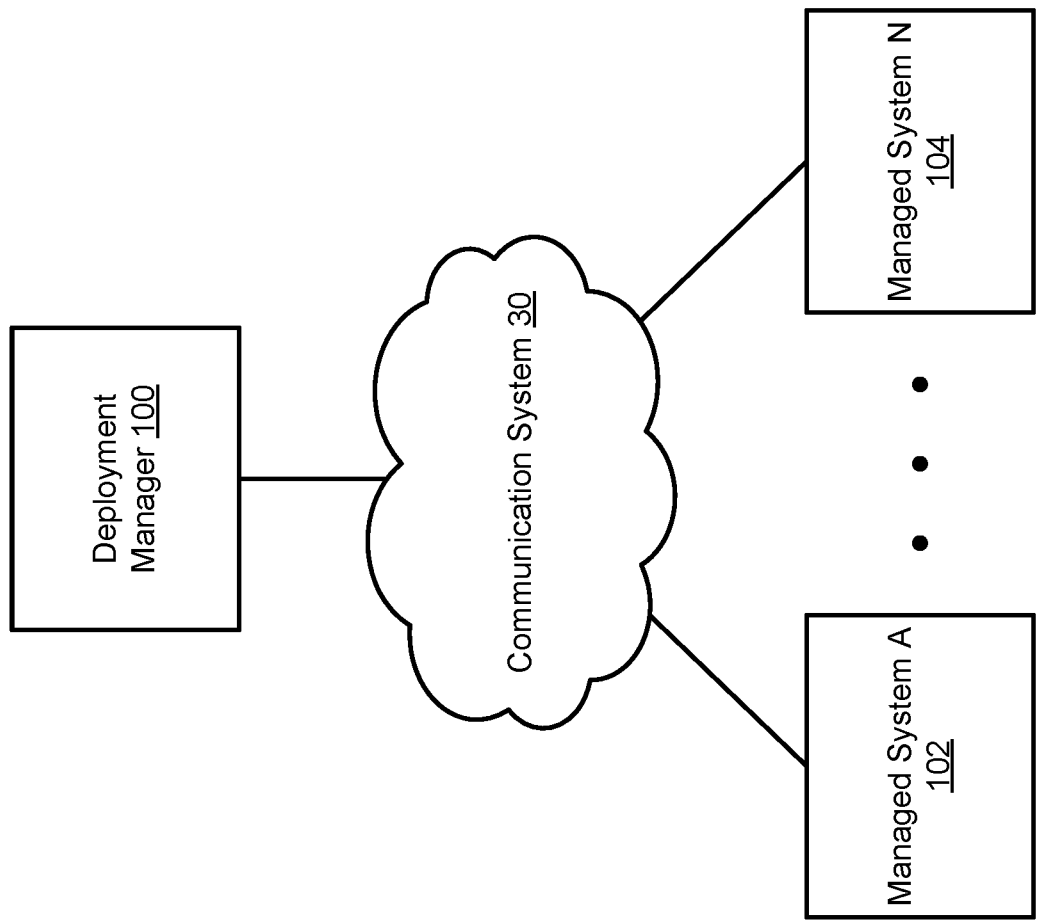
FIG. 1B shows a block diagram illustrating a deployment in accordance with an embodiment.
Figure 1C:
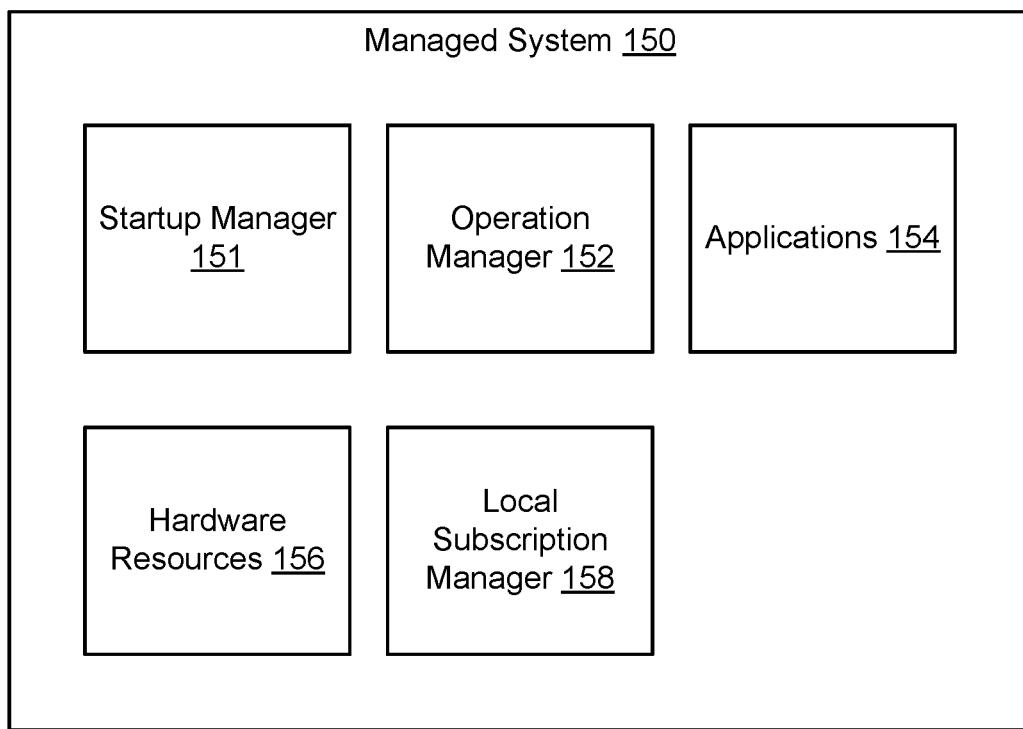
FIG. 1C shows a block diagram illustrating a managed system in accordance with an embodiment.

To provide the aforementioned computer implemented services, any of the managed systems 22A, 22N may need to operate in a predetermined manner consistent with the computer implemented services. For example, certain hardware components may need to be operational and/or certain software components may need to be operating for managed systems 20 to provide certain computer implemented services (e.g., to operate as a solution). Different configurations, numbers, and types of the hardware components and/or software components may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system 20 may be managed by a local control plane for those managed systems. Refer to FIG. 1B for additional details regarding groups of managed systems.

However, to provide desired computer implemented services, corresponding configurations of hardware and/or software components (e.g., applications) necessary for corresponding computer implemented services to be provided by the managed systems may need to be identified, which may be technically challenging. For example, a person may need to be familiar with a range of hardware and software component issues to effectively select the hardware components and/or software components of a system so that the system is capable of providing the desired computer implemented services. Additional complexities may arise when multiple such systems may need to operate cooperatively to provide the computer implemented services. Further, if a system is procured (or loses by virtue of changes in its constituent hardware/software components) that lacks necessary hardware and/or software components, then the procured system may not be able to provide desired computer implemented services.

In additional to challenges in identifying initial configurations to provide certain services, it may also be challenging to ascertain the changes to one or more managed systems (e.g., that provide an existing solution) necessary to provide a different solution. For example, any number of managed systems may provide any number of solutions. It may be challenging to identify the differences between the functionality that the managed systems currently provide and the functionality necessary for other solutions to be provided.

For example, there may be multiple layers of dependence in provided solutions. A first type of solution may presume the existence and availability of one or more other solutions. If these one or more other solutions are not available (e.g., for use through invocation, cooperative action, etc.), then attempts to deploy the first type of solution may be frustrated by the lack of these one or more other solutions which the first type of solution depends on for its operation/functionality.

In general, embodiments disclosed herein relate to system, devices and methods for managing one or more managed systems in a manner that may improve the likelihood of the managed systems being able to provide desired computer implemented services over time. To do so, a system in accordance with embodiments may manage the provisioning of solution level functionality by automating the dynamic process of deploying, configuring, and managing the operation of any number of managed systems. To facilitate automated provisioning of solution level functionality using managed systems, a management service may be provided. Rather than requiring a person to select the type, quantity, software components, and/or other features of managed systems, the management service may allow a user to focus on the desired functionality (e.g., a particular solution providing corresponding computer implemented services) which is to be provided. The management service may automatically translate the desired functionality into a workable deployment configuration of any number of managed systems. The management service may, after the managed systems are deployed, automatically reconfigure the managed systems, deploy software components to, and/or otherwise manage the operation of the managed systems to provide the desired functionality to the user.

By doing so, embodiments disclosed herein may (i) reduce the cognitive burden for selecting and managing systems to provide computer implemented services for desired solutions over time, (ii) may improve the quality of computer implemented services by ensuring that only solutions supported by the managed systems are attempted to be implemented with the managed systems, and/or (iii) automatically limit the use of the desired solutions in a manner consistent with that expected by users to manage cost associated with use of the desired solution.

As part of the above process, the disclosed system may facilitate dynamic changes in the solutions being provided with one or more managed systems. For example, the disclosed system may provide for subscription based management of solutions. When subscriptions for solutions are elected or changed, the system may automatically appropriately reconfigure the operation of managed systems to provide the subscribed to solution. To do so, previously subscribed to solutions (e.g., that are no longer subscribed to due to changes in subscriptions) may no longer be provided through disablement of operations of managed systems corresponding to the no longer subscribed to solutions. Once disablement of the operations of the managed systems is complete, then the managed systems may be reconfigured to operate in a manner consistent with newly subscribed to or changed subscriptions. In this manner, persons may only need to make changes in subscriptions to automatically facilitate reconfiguration and management of any number of managed systems.

To provide the above noted functionality, a system in accordance with an embodiment may include subscription management service 10. Subscription management service 10 may facilitate (i) selection and procurement of managed systems to a client site (e.g., a deployment location), and (ii) automatic configuration of managed systems 20 to provide solutions (which may change) over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) automatically deploy software components to managed systems 20 using a subscription model, (iv) when changes in desired functionality occur, automatically reconfigure, remove software components, and deploy new software components to the managed systems to modify their operation to provide the desired functionality (e.g., through disablement of no-longer subscribed to solutions and enablement of newly subscribed to solutions), (v) log changes in subscriptions both locally with the managed system and with the subscription management service, and (vi) manage the use of the deployed managed systems using the subscription model in accordance with the logged subscriptions. With respect to post-subscription management of the managed systems, any number of subscription limitations may be used to define when and to what extent managed systems will be reconfigured or otherwise modified when subscriptions for various solutions are terminated (e.g., due to time duration limitations, use limitations, etc. for the subscriptions).

To deploy a solution, a known topology of management entities and/or a software stack may be instantiated on the managed systems. Additionally, if already used for an existing solution that is being modified, any number of software entities hosted by the managed systems may be removed or modified, and various configurations for the managed systems may be modified. Once the software stack is instantiated or modified if already existing from providing of other solutions, a subscription corresponding to a solution provided by the instantiated entities/software/reconfiguration may be both locally recorded with the managed systems and remotely recorded with the management service.

When a solution subscription terminates, the managed systems may automatically be reconfigured to prevent the no-longer subscribed to solutions from being provided. To do so, local entities hosted by the managed system may automatically and without user intervention reconfigure or otherwise modify the operation of the managed systems. As part of that process, in some embodiments, solution data may be retained for future use, even though a subscription for a solution associated with the solution data is no longer subscribed for the managed systems. Consequently, the utility provided by a solution with respect to the data may be retained for future use by a previous subscriber even after the solution subscription ends.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made on the basis that the requesting entity may be likely to request additional features and/or capabilities in the future. Consequently, managed systems 20, when deployed to a client site, may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20).

Because a user of the managed systems may not subscribe to or otherwise wish to utilize various capabilities beyond that requested initially, only a subset of the functionality of a managed system may be initially subscribed to by the user. When deployed, subscription management service 10 may configure the managed system to only provide the subscribed to functionality. Additionally, as the subscriptions for the user change over time, subscription management service 10 may automatically reconfigure the managed systems to only provide the subscribed to functionality.

Subscription management service 10 may also allow a provider of managed systems 20 to selectively manage various functionalities (e.g., parts of solutions) provided by managed systems 20. For example, the service may allow for different solutions to be provided by managed systems 20 over time through performance of disablement actions and/or enablement actions. By doing so, a provider of managed systems 20 may tailor the solutions provided by managed systems 20 (e.g., from all possible solutions) to only those requested, desired, and/or procured by an operator, manager, and/or user of managed systems 20, and automatically adjust to changes to requested solutions over time. Doing so may allow for cost controls for various solutions to be put in place by a user of a managed system.

For example, consider a scenario where a provider of a managed system does so on a contractual basis where a user of the managed system agrees to purchase subscriptions for various solutions. The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional (or reduced numbers of) features to be utilized by the users. If a subscription is not renewed or otherwise updated, then the managed systems may automatically take action to prevent use of the solution. This process may be seamless to the users of the solutions and the resulting solutions may be presented to the users via the subscription management service. Consequently, the users may not need to interact with the managed systems as the solutions are modified to meet their requirements over time.

To allow for users or other persons associated with managed systems to elect into such subscriptions, subscription management service 10 may provide graphical user interfaces that allow such selections to be made. The graphical user interfaces may be implemented, for example, with webpages (or other mechanism) accessible to the users or other persons via other devices (e.g., client/user devices not illustrated in FIG. 1A but may be operably connected to subscription management service 10 via communication system 30 or directly using managed systems 20). When an election is made, subscription management service 10 may record the election and send information regarding the elected subscriptions or changes in subscriptions to local subscription managers hosted by managed systems 20. Various limitations on the subscriptions may also be elected at that time such as, for example, duration or use based limitations. Once sent, the local subscription managers may modify the operation of managed systems 20 such that the operation of managed systems 20 matches the elections received and/or recorded by subscription management service 10, including termination of solution access when corresponding subscriptions expire.

To facilitate solution selection, the graphical user interfaces presented to the users may present solutions that are compatible with managed systems 20. Accordingly, the persons tasked with managed systems may not need to be aware of the current configuration of managed systems 20, the capabilities, or limitations of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert (or disable, or otherwise modify) a previously implemented modification of the operation of a managed system to comply with an elected subscription and/or limitations thereof. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems that does not rely on or require communication with other entities.

In an embodiment, the code blocks include executable computer code that may be executed by a processor of a managed system. The local subscription manager may push or otherwise cause various code blocks to be executed by processors of host managed systems. The code blocks may cause the managed systems to perform any number of enablement and/or disablement actions. The actions may include, for example, (i) enabling/disabling hardware components, (ii) enabling/disabling software components, (iii) modifying configurations of hardware and/or software components, (iv) retaining solution data or other information for future use (e.g., which may otherwise be lost due to the performance of a disablement action), and/or (v) other actions to enforce compliance with subscriptions. The code blocks may cause other actions to be performed without departing from embodiments disclosed herein. In an embodiment, some of the enablement and/or disablement actions are performed by the local subscription managers hosted by managed systems.

Some of the enablement and/or disablement actions may cause managed systems to store data in and/or retrieve data from data storage system 14. Data storage system 14 may store any type and quantity of data. The stored data may include, for example, copies of management data for various entities, copies of solution data from various managed systems, and/or other types of data.

For example, in cases of subscription termination and/or expiration, some solution data may be stored in data storage system 14 (or other locations) while one or more disablement actions are performed. Doing so may retain the stored copy of the data even when disablement actions such as reformatting drives of a managed system on which the solution data is stored is performed. Once certain disablement actions are completed, then various portions of the solution data stored in data storage system 14 may be imported back to the managed system. Consequently, the solution data relevant to users may be retained while the functionality associated with the solution functionality may no longer be usable with the managed system.

In addition to data storage functionality, data storage system 14 may include data conversion functionality. Data storage system 14 (or other components) may convert stored solution data to other formats or otherwise modify it to place it in a condition desired by a previous subscriber to the solution with which the solution data was generated/used/ etc.

In an embodiment, data storage system 14 is implemented with a public and/or private cloud. For example, an on premises, off premises, or hybrid environment may be used to store the data.

Any of subscription management service 10, managed systems supply 12, data storage system 14, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, data storage system 14, and managed systems 20 are operably connected via communication system 30. Communication system 30 may allow any of subscription management service 10, managed systems supply 12, data storage system 14, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, data storage system 14, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment (and the provider of the solutions may be responsible for managing operation of managed systems that provide the solutions). The solutions may include any number and type of computer implemented services provided by any number of managed systems 102, 104.

The deployment may include deployment manager 100. Deployment manager 100 may locally manage any number of managed systems 102, 104. For example, the subscription management service 10 may obtain information regarding desired solutions and provide information usable to provide the solutions to deployment manager 100, which may in turn manage managed systems 102, 104 based on the information.

To facilitate management, deployment manager 100 may (i) host (or may retrieve/facilitate retrieval of) various software images to facilitate deployment of software necessary for various solutions for managed systems 102, 104 to be implemented, (ii) manage communications such as acknowledgements between subscription management service 10 and managed systems 102, 104 during implementation of solutions and removal of existing solutions, and/or (iii) provide other management functionalities (e.g., such as storing copies of solution data from managed systems 102, 104 during performance of disablement actions thereby retaining the solution data). Thus, deployment manager 100 may function as a control plane for any number of managed systems 102, 104, which may be managed via software deployment to cooperatively provide one or more solutions.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

Turning to FIG. 1C, a block diagram illustrating managed system 150 in accordance with an embodiment is shown.

Managed system 150 may be similar to any of managed systems 20 shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide (in isolation and/or cooperation with other managed systems) a solution by virtue of its operation in the reconfigured state.

To provide the solutions, a combination of management entities and a software stack may need to be deployed to a host managed system. Additionally, various configurations for the managed system may need to be set. Different solutions may be provided with similar or different combinations of management entities, software stacks, and various configurations.

In addition (and/or alternatively) to any of the components shown in FIG. 6, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154 (e.g., which may include one or more software stacks). For example, after managed system 150 is power cycled, managed system 150 may not be in an operating state in which (all or a portion of) applications 154 may operate. To enter the operating state, startup manager 151 may perform any number processes such as (i) a power on self-test, (ii) displaying various portions of information regarding the function of a host managed system, (iii) performing an inventory of hardware resources 156, and (iv) beginning execution of and/or handing off operation management of managed system 150 to operation manager 152 (e.g., the actions in aggregate being a "startup"). Startup manager 151 may be implemented with, for example, a basic input output system (BIOS) or other type of startup management entity.

In an embodiment, startup manager 151 includes one or more configurations which may modify the manner in which it performs the startup. For example, the configurations may allow various actions to be added to, removed from, and/or modified in the startup.

In an embodiment, startup manager 151 also includes functionality to cause information regarding the function of a host managed system to be presented. For example, startup manager 151 may include functionality to generate and display graphical user interfaces which may indicate, to users, a function of the host managed system. Different types of graphical user interfaces may be displayed depending on how a "personality" of a host managed system is set thereby allowing users to be appraised regarding the expected functionality of the host managed system.

Operation manager 152 may generally manage operation of the components of managed system 150 after completion of startups by startup manager 151, except for local subscription manager 158. For example, operation manager 152 may be implemented with an operating system (and/or other management entities such as drivers, translation tables, etc.) used to manage hardware resources 156 of managed system 150 to facilitate execution of applications 154.

To facilitate provisioning of a solution with managed system 150, local subscription manager 158 may facilitate automatic deployment of software components, settings, and/or other features to managed system 150. The deployed software components may include all, or a portion, of startup manager 151, operation manager 152, and applications 154.

Likewise, local subscription manager 158 may facilitate automatic removal of software components. Further, local subscription manager 158 may also facilitate disabling and/or enabling various hardware components (e.g., of hardware resources 156). Doing so may provide for selective limitation of various functionalities of managed system 150. For example, when a hardware component is disabled, startup manager 151 may treat it as not being present thereby causing operation manager 152 and applications 154 to operate as though it is not present as well, thereby allowing for selective restriction of use of hardware resources 156. Similar processes may be performed for software components and configurations.

To ensure that only software components compatible with hardware resources 156 are deployed, local subscription manager 158 may maintain current information regarding hardware resources 156 such as the types and quantities of hardware devices of hardware resources 156. Local subscription manager 158 may use the current information to identify compatibility between managed system 150 and various solutions, and enforce solution limitations (e.g., restrict) on managed system 150. When doing so, local subscription manager 158 may provide subscription management service 10 with information about its solution compatibilities thereby allowing subscription management service 10 to only provide for deployment of solutions compatible with managed system 150.

Applications 154 may provide all, or a portion, of the computer implemented services desired by a user, operator, or other person associated with managed system 150. For example, applications 154 may include one or more software stacks corresponding to on one or more solutions.

Applications 154 may utilize hardware resources 156 to provide their respective functionalities. The type and quantity of applications 154 that may be hosted by managed system 150 may depend on hardware resources 156 (e.g., types and quantity of hardware devices). By limiting (e.g., through disablement) or expanding (e.g., through enablement) access to hardware resources 156, managed system 150 may become compatible with or lose compatibility with various solutions (e.g., which may require certain hardware resources to be present for implementation of the solutions).

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as the capabilities of hardware resources 156. Different types of operation managers 152 may facilitate compatibility with different solutions. For example, some solutions may require certain software stacks that may depend on the presence of a particular operation manager.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

In an embodiment, hardware resources 156 include one or more processors. The processors may be used by local subscription manager 158 to execute various code blocks. For example, local subscription manager 158 may include functionality to push code blocks to the processors through an interface. The pushed code blocks may be executed by the processors thereby causing managed system 150 to perform one or more actions. Local subscription manager 158 may do so to, for example, modify operation of managed system 150 to match corresponding subscriptions, or disable various functionalities due to lack of certain subscriptions.

In an embodiment, hardware resources 156 include one or more storage devices such as hard disk drives, solid state disk drives, and/or other types of storage devices. Various types of data may be stored on the storage devices including solution data. Solution data may be data that is generated by and/or used in solutions provided by managed system 150. When a subscription for a solution expires, the solution data may or may not be retained for future use. A user that establishes the subscription may elect whether to retain or not retain solution data, may elect where the solution is to be retained, and/or may specify other information regarding solution data post subscription expiration. As will be discussed below, when solution data is elected for retention, the solution data may be preserved while other types of data (e.g., computer instructions for startup manager 151, operation manager 152, applications 154, and/or other types of entities) may be purged (in part or entirely) from the storage devices or may otherwise be rendered inaccessible (e.g., by locking it with password protections or other mechanisms such as concealment) to make a now-expired solution unable to be provided with managed system 150.

Local subscription manager 158 may provide subscription management services. Subscription management services may include (i) obtaining subscription updates, (ii) removing, adding, or modifying software components (e.g., startup manager 151, operation manager 152, applications 154, etc.) and/or hardware resources 156 (or portion thereof) based on the subscription updates, and (iii) enforcing the subscription updates including any limitations specified therein.

By providing its functionality, local subscription manager 158 may manage the configuration, behavior, and/or functionality of managed system 150 in a manner that automatically conforms it to match that expected by subscription management service 10 (e.g., to match those solutions to which managed system 150 is subscribed). As part of the aforementioned process, local subscription manager 158, subscription management service 10, and/or deployment manager 100 may cooperate to enforce subscriptions on managed system 150.

Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software components of managed system 150. For example, the management controller may include functionality to load software components on a host managed system, obtain information regarding hardware resources 156, remove or disable components, etc.

In an embodiment, the management controller includes a separate communication interface (e.g., from that of a communication interface of managed system 150, referred to as an out of band interface) through which it communicates with subscription management service 10 and/or deployment manager 100. In an embodiment, the management controller uses the same communication interface (e.g., an in band interface) which managed system 150 uses to communicate with other devices. Either of these communication interfaces may facilitate communications with communication system 30, and devices connected to communication system 30 such as subscription management service 10 or deployment manager 100.

Figure 1D:
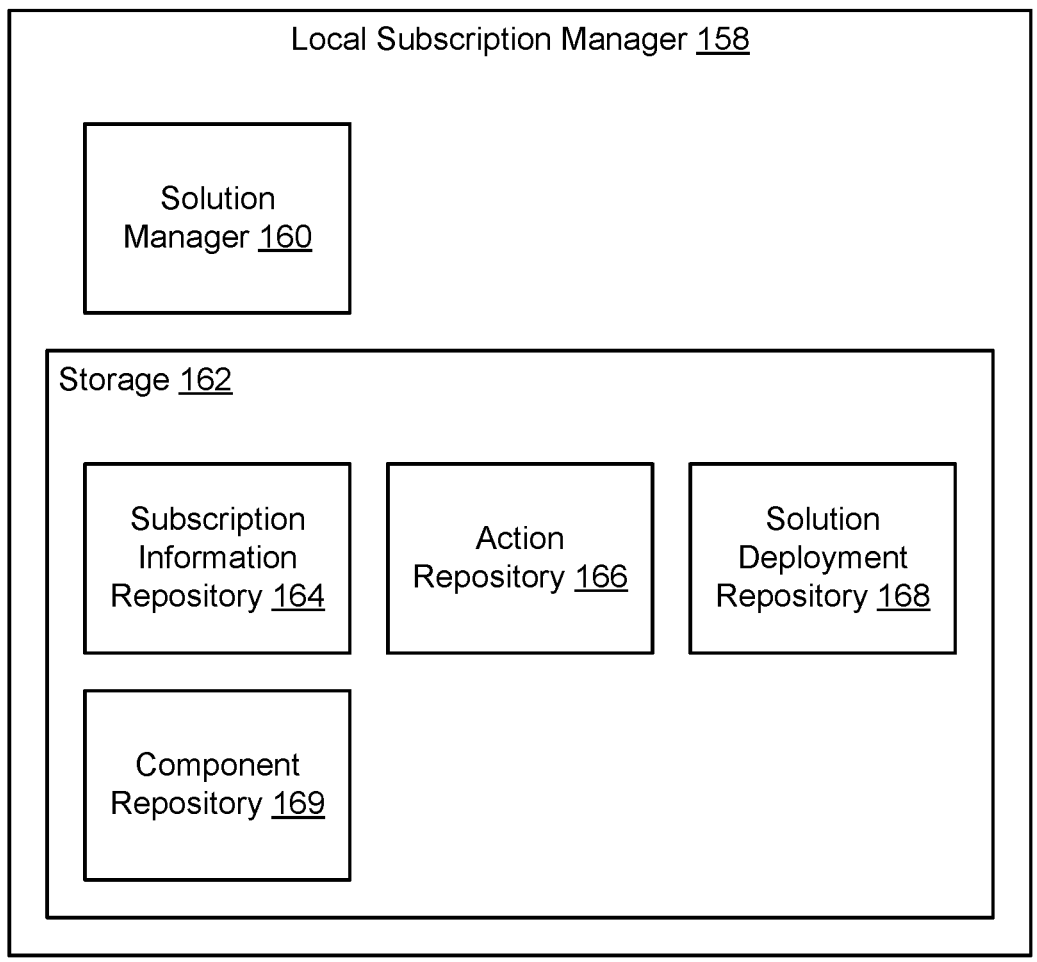
FIG. 1D shows a block diagram illustrating a local subscription manager in accordance with an embodiment.

When providing its functionality, local subscription manager 158 may perform all, or a portion, of the methods and operations illustrated in FIGS. 2-5B. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 6 (except for the local subscription manager). In addition (and/or alternatively) to any of the components shown in FIG. 6, local subscription manager 158 may include solution manager 160 and storage 162. Each of these components is discussed below.

Solution manager 160 may include functionality to (i) obtain information regarding solutions to be implemented by a host managed system and/or changes to solutions (e.g., terminations) implemented by the host managed system, (ii) deploy, remove, and/or modify software components to place the host managed system into condition to function as part of the solution or in a default mode when no solutions implicating certain operational states are implemented, (iii) enable and/or disable various hardware components of a host managed system), and/or (iv) record information regarding enforced subscriptions, and limitations thereof, for the host managed system. By doing so, a host managed system may be more likely to provide desired computer implemented services by improving the likelihood that a managed system is configured to provide the desired solution while limiting the functionality of the host managed system to only subscribed to solutions.

When providing its functionality, solution manager 160 may perform all or a portion of the methods and processes illustrated in and discussed with respect to FIGS. 2-5B.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In an embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a host managed system that hosts local subscription manager 158.

Storage 162 may store data structures including subscription information repository 164, action repository 166, solution deployment repository 168, and component repository 169.

Subscription information repository 164 may be implemented with one or more data structures that store information regarding subscriptions for a host managed system. The information may include, for example, functionalities to be provided while a subscription is enforced, limitations on the duration of the subscription, and/or information usable to prevent use of a subscribed to function/solution. For example, subscription information repository 164 may include code blocks or other code executable by a host managed system that removes the ability of users of the host managed system to use one or more functionalities of the host managed system. Execution of the code blocks by a host managed system may be initiated by local subscription manager 158 when a corresponding subscription expires (or meets another type of limitation indicating that a code block should be executed).

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a subscription being terminated.

In an embodiment, action repository 166 includes at least one set of actions keyed to terminations and/or expirations in a subscription. The actions may include (i) exporting all, or a portion of, solution data from a host managed system prior to performance of one or more disablement actions that may make the solution data inaccessible, and (ii) after the disablement actions are performed, import the previously exported data. Doing so may allow for continuity of access to data even in the event of a solution subscription termination and/or expiration. Additionally, the actions may include modifying a format of the data such that the imported data may have a different format from the solution data rendered inaccessible by the disablement actions.

In an embodiment, the at least one set of actions include actions that cause default entities to be instantiated and configured with default settings when a host managed system is not subscribed to any solutions (or solutions that do not specify all components/configurations for the managed system). The actions may be performed when, for example, a subscription is terminated or it expires. Consequently, subscribed to functionality may be replaced with a default level of functionality.

As new subscriptions or changes (e.g., terminations) to subscriptions are obtained and implemented, solution manager 160 may update subscription information repository 164 and/or action repository 166 based on the subscriptions. Thus, the subscriptions may be locally recorded. Likewise, solution manager 160 may remotely record implementation of the subscriptions with a subscription management service. Consequently, both the subscription management service and local subscription manager may operate in accordance with the same information, thereby providing for a subscription based management model of solutions that is eventually consistent across the distributed system.

Solution deployment repository 168 may be implemented with one or more data structures that store information regarding how various types of solutions may be implemented with a host managed system. The information may include, for example, a list of software components to be hosted by a managed system to provide the solution, a list of actions and/or an order of the actions to cause the software components to be deployed, location information for various software components, and/or other information usable to implement a solution. While illustrated in FIG. 1D as being stored in the local subscription manager 158, solution deployment repository 168 may be hosted by other entities (e.g., deployment manager 100) which may obtain and provide relevant information from the repository for various solutions to be implemented by a host managed system.

Component repository 169 may be implemented with one or more data structures that store copies of and/or information usable to obtain copies of various software components and/or configuration settings for software and/or hardware components of a host managed system. Solution deployment repository 168 may include references to various portions of component repository 169 to allow for various software components and/or configuration settings to be obtained.

In an embodiment, component repository 169 includes one or more data structures corresponding to default copies of various software components and/or configuration settings for software and/or hardware components of the host managed system. The defaults included in component repository 169 may be used, for example, when solution subscriptions expire. Thus, the defaults may be used in the absence of subscriptions.

While illustrated in FIG. 1D as being stored in the local subscription manager 158, component repository 169 may be hosted by other entities (e.g., deployment manager 100).

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

As discussed above, the components of FIG. 1A may perform various methods to provide computer implemented services using managed systems that may provide respective solutions, while appropriately subscribed. FIGS. 2-5B illustrate examples of methods that may be performed by the components of FIG. 1A.

Figure 2:
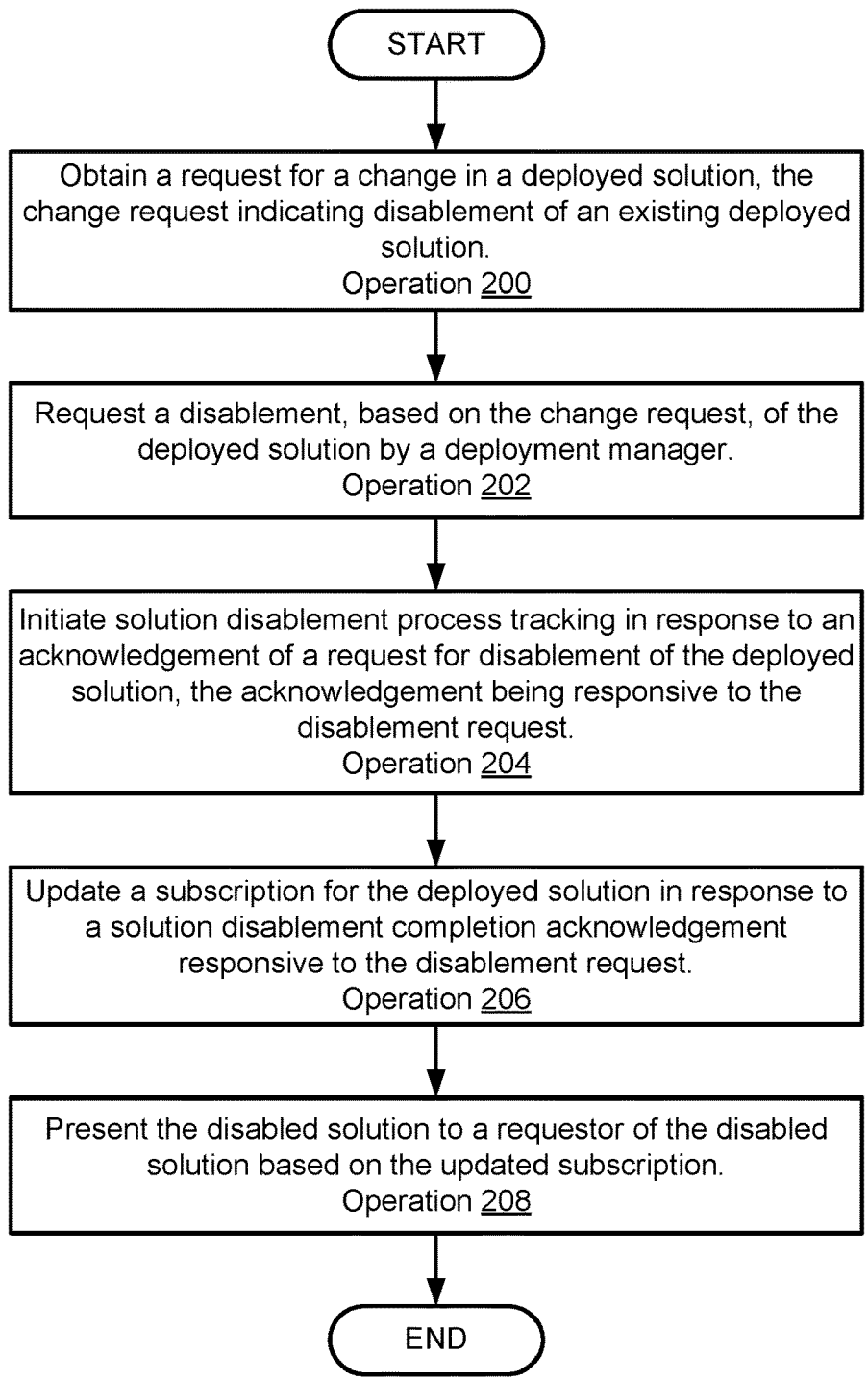
FIG. 2 shows a flow diagram illustrating a method of servicing solution requests in accordance with an embodiment.

Turning to FIG. 2, a flow diagram illustrating a method of servicing a solution change request in accordance with an embodiment is shown. The method illustrated in FIG. 2 may be performed by a subscription management service when a request for a change in a solution is received.

At operation 200, a request for a change in a deployed solution is received. The change request may indicate disablement of an existing deployed solution.

In an embodiment, the change request may be received by presenting one or more solutions for a deployment, or components thereof, to a user via a graphical user interface (e.g., presented to the user on a user device operably connected to the subscription management service). The user may select the solution and may also specify any limitations for a subscription to the solution such as, for example, a duration of the subscription. The change request may be obtained via other methods without departing from embodiments disclosed herein.

In an embodiment, the change request includes an identifier of a solution and one or more limitations (e.g., duration, number of performed services, processes, etc.) for a subscription to the solution. The solution may be any type of solution that may be provided with one or more corresponding computer implemented services.

In an embodiment, the change request includes an implicit or explicit subscription termination. For example, the change request for the deployed solution may indicate that an existing subscription for the deployed solution is to be changed (e.g., upgraded, downgraded, otherwise modified) and/or terminated.

At operation 202, disablement of the deployed solution by a deployment manager is requested. The deployment manager may manage one or more managed systems. The disablement of the deployed solution may be requested by sending a message (e.g., a solution modification request) to a deployment manager indicating the modification for the deployed solution.

At operation 204, a solution disablement tracking processing is initiated in response to an acknowledgement of the disablement request. The acknowledgement may be sent by the deployment manager to the subscription management service when one or more of the managed devices managed by the deployment manager begin a process of disabling the deployed solution. The deployed solution disablement may be tracked by adding information to the subscription repository (e.g., maintained by the subscription management service) indicating that the solution is being disabled but is not yet disabled.

At operation 206, a subscription for the deployed solution is updated in response to a solution disablement completion acknowledgement from the deployment manager. The solution disablement completion acknowledgement may be sent in a message to the subscription management service once the managed systems have been configured to no longer provide the deployed solution specified by the change request. The subscription for the deployed solution may be updated by modifying the subscription repository to indicate that the subscription is dead. In some embodiments, the subscription information repository may be purged of information regarding the now-terminated subscription for the deployed solution. The lack of the purged information may indicate that the subscription for the deployed solution is dead. The solution deployment completion acknowledgement may be responsive to the change request.

At operation 208, the disabled solution is presented to a requestor of the change in the deployed solution. The presentation may be based on the updated subscription. For example, the subscription management system may send a message or otherwise indicate to the requestor (e.g., the user that sent the change request in operation 200) that the deployed solution is no longer available for use.

The method may end following operation 208.

While various communications using messages have been described with respect to the operations of FIG. 2, other methods for managing a distributed system may be implemented without departing from embodiments disclosed herein. For example, publish-subscribe systems, master-slave systems, and/or other types of distributed system management may be employed rather than and/or in conjunction with message passing or other command and control schemes.

Figure 3:
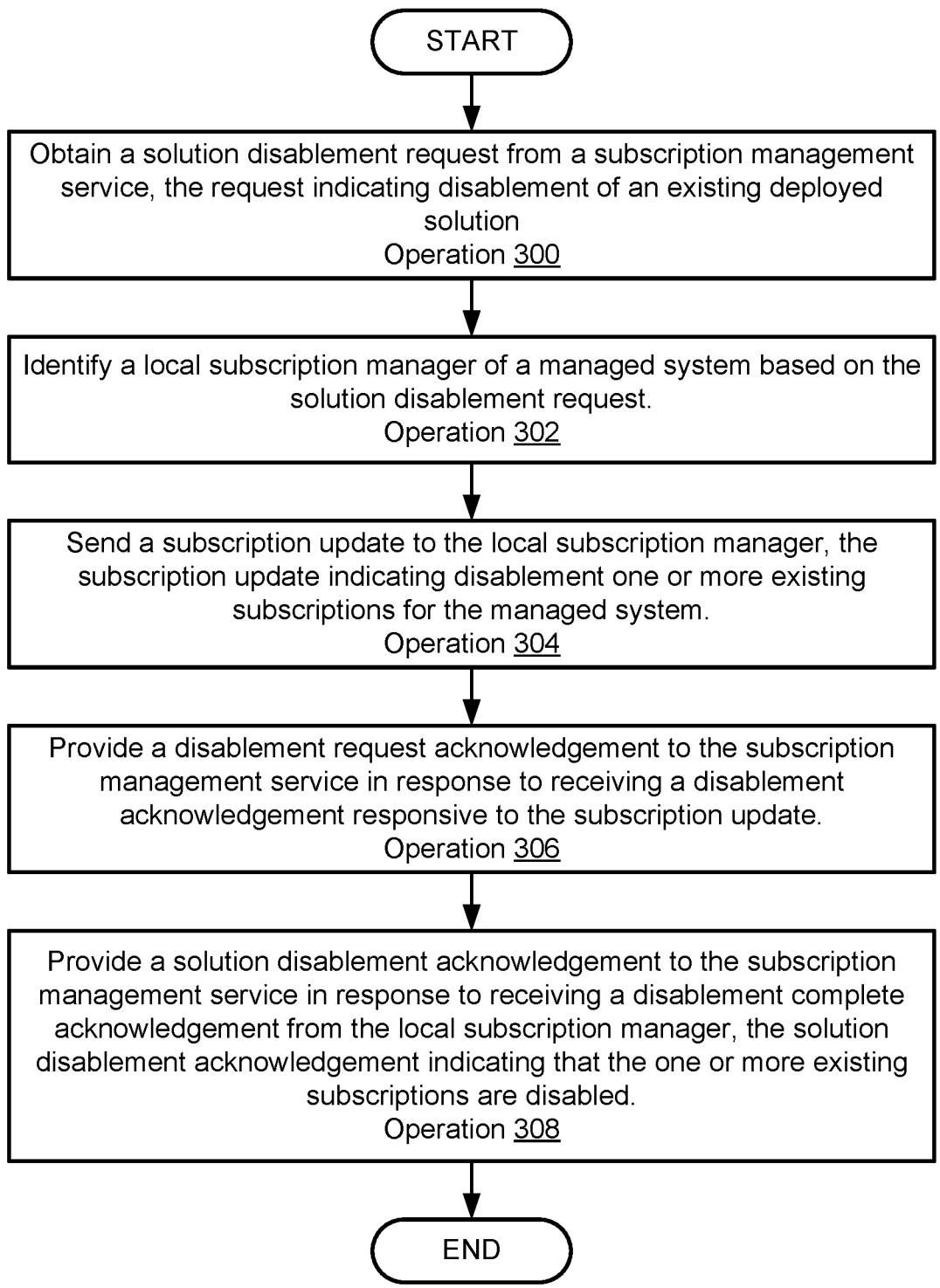
FIG. 3 shows a flow diagram illustrating a method of servicing solution termination requests in accordance with an embodiment.

Turning to FIG. 3, a flow diagram illustrating a method of servicing a solution disablement request in accordance with an embodiment is shown. The method illustrated in FIG. 3 may be performed by a deployment manager that manages any number of managed systems and is managed by a subscription management service.

At operation 300, a solution disablement request is obtained from a subscription management service. The solution disablement request may indicate that an existing deployed solution is to be disabled (e.g., no longer provided and is no longer subscribed to). The solution disablement request may also specify, for example, whether all or portion of solution data for the solution is to be retained (e.g., which may be specified by an entry of a subscription information repository corresponding to the to-be-disabled solution). The solution disablement request may be obtained in a message from the subscription management service, and/or via other methods.

At operation 302, a local subscription manager of a managed system is identified based on the solution disablement request. For example, the disablement request may include an identifier of the solution, and the deployment manager may include a list of solutions being implemented with corresponding managed devices. The managed system may be discriminated from other managed systems that are not being used to provide the solution identified in the solution disablement request. The local subscription manager hosted by the discriminated managed system may be the identified local subscription manager.

At operation 304, a subscription update is sent to the local subscription manager of the managed system. The subscription update may indicate disablement one or more existing subscriptions for the managed system.

For example, the subscription update may include identifiers of the one or more existing subscriptions, information regarding whether solution data is to be retained, and/or other types of information usable to facilitate disablement of the existing deployed solution.

The subscription update may be sent via one or more messages to the identified local subscription manager. The subscription update may be sent via other methods without departing from embodiments disclosed herein.

At operation 306, a disablement acknowledgement request acknowledgement is provided to the subscription management service in response to receiving a disablement acknowledgement responsive to the subscription update. The disablement request acknowledgement may be provided by sending it (or information indicating as much) to the subscription management service in a message and/or via other methods. The disablement acknowledgement may be responsive to the subscription update and may be generated by the local subscription manager when the local subscription manager completes, initiates, or otherwise participates in disablement of the existing deployed solution. The disablement acknowledgement responsive to the subscription update may be received via a message.

At operation 308, a solution disablement acknowledgement is provided to the subscription management service in response to receiving a disablement complete acknowledgement responsive to the subscription update. The solution disablement acknowledgement may indicate that the one or more existing subscriptions are disabled. The solution disablement acknowledgement may be provided by sending it to the subscription management service in a message and/or via other methods. The disablement complete acknowledgement responsive to the subscription update may be generated by the local subscription manager when the local subscription manager completes disablement of the one or more existing subscriptions.

The method may end following operation 308.

The method illustrated in FIG. 3 may be repeated any number of times to facilitate configuration of any number of managed systems so that only subscribed to solutions are provided with managed systems, thereby allowing for solution cost management.

While not illustrated in FIGS. 3, the deployment manager may also coordinate or otherwise facilitate export, archiving, and/or otherwise managing solution data during servicing of the solution disablement request. For example, copies of solution data may be exported to the deployment manager (or storage locations), the copies may be modified for compatibility reasons, and the modified copies may be imported to or otherwise instantiated on the managed systems after subscription disablement is complete (or passed a point at which the disablement process may cause loss of solution data).

Figure 4:
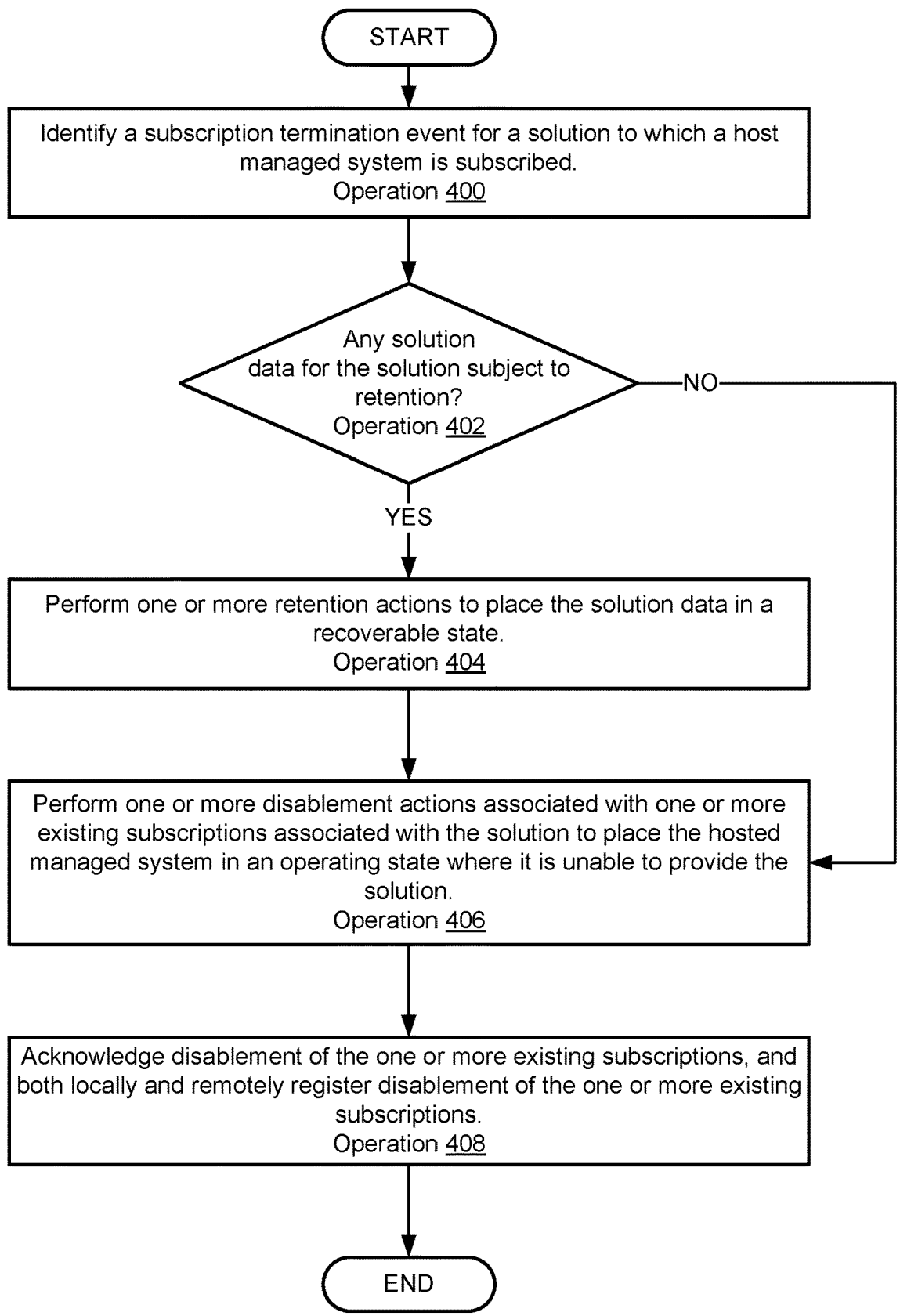
FIG. 4 shows a flow diagram illustrating a method of servicing subscription updates in accordance with an embodiment.

Turning to FIG. 4, flow diagrams illustrating a method of servicing a subscription update in accordance with an embodiment is shown. The method illustrated in FIG. 4 may be performed by a local subscription manager hosted by a host managed system.

At operation 400, a subscription termination event for a solution to which a host managed system is subscribed is identified. The subscription termination event may indicate that the solution is to no longer be provided.

In an embodiment, the subscription termination event is a subscription limitation for the subscription to the solution being exceeded. For example, the subscription limitation may be a point in time, duration of time, or other type of time metric that indicates an end of the subscription. The subscription limitation may be other types of limitations such as, for example, use based limitations (e.g., a limit on a quantity of uses of the solution) or another type of event.

In an embodiment, the subscription termination event is identified by obtaining a subscription update for the subscription for the solution. The subscription update may indicate a termination or end of the subscription. The subscription update may be obtained via one or more messages (e.g., from a subscription management service).

In an embodiment, the subscription termination event is identified based on operation of the host managed system. For example, operation of the host managed system may be monitored by the local subscription manager. The local subscription manager may identify a subscription limitation being exceeded via the monitoring. For example, the local subscription manager may monitor the host managed system to identify uses of and/or use rates of the solution and compare the use/use rate to a corresponding subscription limitation to identify the termination event. Likewise, the local subscription manager may monitor the time and compare the time to a corresponding subscription limitation (e.g., time base) to identify the subscription event. Multiple subscription limitations may correspond to a subscription and through which different types of subscription termination events may be identified (e.g., through monitoring of operation and comparison to the subscription limitations).

At operation 402, a determination is made regarding whether any solution data for the solution is subject to retention. If the solution data (all or a portion) is subject to retention, then the local subscription manager may take action to ensure that the solution data subject to the retention is available in the future.

In an embodiment, the determination is made based on (i) subscription information locally maintained by the local subscription manager (which may indicate whether solution data for a subscription is subject to retention, (ii) retention information obtained from other entities (e.g., a subscription manager may indicate, as part of a subscription update indicating subscription termination, whether the solution data associated with the subscription is subject to retention), and/or (iii) with one or more policies which may define whether the solution data is subject to retention. For example, the aforementioned information may be evaluated to ascertain whether any of it indicates that the solution data is subject to retention. The local subscription manager may treat the solution data as being subject to retention if any portion of the aforementioned information indicating that the solution data is subject to retention.

If it is determined that the solution data is subject to retention, then the method may proceed to operation 404. Otherwise, the method may proceed to operation 406.

At operation 404, one or more retention actions are performed to place the solution data in a recoverable state.

In an embodiment, the one or more retention actions include storing a copy (all or a portion) of the retention data (i) with another device, (ii) in a protected partition of the host managed system that will not be impacted by subsequently performed disablement actions, and/or (iii) with the local subscription manager. The one or more retention actions may also include, for example, modifying a format of the copy of the retention data based on expected capabilities of the host managed system after performance of the disablement actions. Consequently, the copy of the retention data (in part or entirely) may be able to be utilized by the host managed system even after the disablement actions are performed (so long as the solution data is accessible) which may render the host managed system unable to utilize the original solution data (e.g., due to format or other compatibility reasons).

At operation 406, one or more disablement actions associated with one or more subscriptions are performed. The one or more subscriptions may be associated with the solution indicated to be terminated by the subscription termination event. Performing the one or more disablement actions may place the host managed system in an operating state where it is unable to provide the solution indicated to be terminated by the subscription termination event.

In an embodiment, the one or more disablement actions may be performed by pushing one or more code blocks to the host managed system for execution by one or more processors. The one or more processors may cause the one or more disablement actions to be performed when execute the code blocks.

In an embodiment, the disablement actions include (i) modifying (e.g., via replacement, modification, reconfiguration) operation of a startup manager to cause startups of the host managed system to be performed differently, (ii) modifying a personality of the host managed system to cause it to indicate (e.g., via displayed graphical user interfaces), to users or other devices, that the host managed system performs a different function, (iii) modifying (e.g., via replacement, modification, reconfiguration) operation of an operation manager to the host managed system to operate in a different nominal manner, (iv) modifying a solution stack (e.g., via replacement, modification, reconfiguration) such that the host managed system may be able to provide fewer and/or different computer implemented services, (v) modifying available hardware devices through selective enablement/disablement (in some cases, some hardware devices may be disabled and other hardware devices may be enabled by selectively powering them such that startup managers/operation managers are only aware of the powered hardware devices), and/or (vi) modifying data storages (e.g., via reformatting) for provisioning of different services which may cause solution data (all or a portion) stored therein to be lost if not retained.

The one or more disablement actions may also include actions performed by other devices such as a local subscription manager, deployment manager, or other devices through, for example, cooperatively storing solution data for future use/utility.

In an embodiment, the disablement actions also include recovering solution data. The solution data may be recovered using the copy of the solution data stored in operation 404. For example, the copy may be used to populate a reformatted storage of the host managed system with the copy of the solution data. The disablement actions may also include modifying a format of the solution data and/or directing solution stack (or other entities) to utilize the populated solution data. Consequently, after disablement of a solution, the solution data may still be available for use even though the normal services provided by the solution may no longer be available.

At operation 408, disablement of the one or more existing subscriptions is acknowledged. The acknowledgement may be made by sending a message to a subscription management service indicating that the one or more existing subscriptions have been disabled and corresponding solutions are no longer being provided.

In an embodiment, the disablement of the one or more existing subscriptions is registered locally and/or remotely. For example, entries of subscription information repositories (e.g., maintained locally by the local subscription manager and remotely by the subscription management service) may be modified to indicate the disablement. In an embodiment, the disablement is indicated by purging (or otherwise removing) the entries corresponding to one or more existing subscriptions from the repositories. Consequently, the lack of entries indicating that the one or more existing subscriptions are live may be interpreted as the one or more existing subscriptions being disabled.

The method may end following operation 408.

Using the method illustrated in FIG. 4, embodiments disclosed herein may provide for the automatic disablement of various solutions without overly constraining the operation of managed systems. For example, rather than prevent use of all functionalities, host managed system may only be modified to remove the specifically subscribed to functionality. Consequently, the users of such systems may not be deprived of any functionalities to which they are entitled even in the event of a subscription termination event.

Figure 5A:
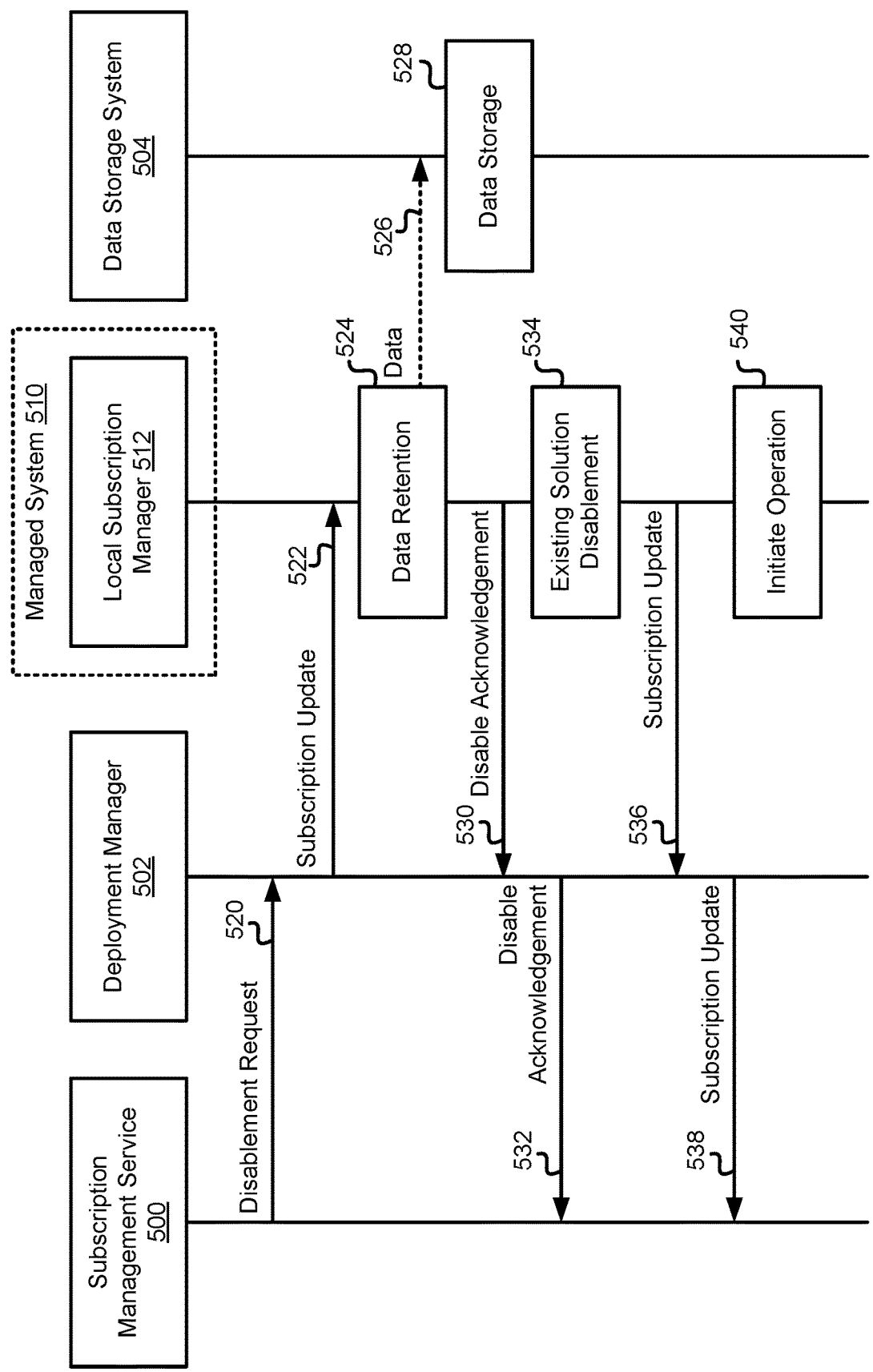
FIGS. 5A-5B show diagrams illustrating interactions between and actions of components of a system in accordance with an embodiment.
Figure 5B:
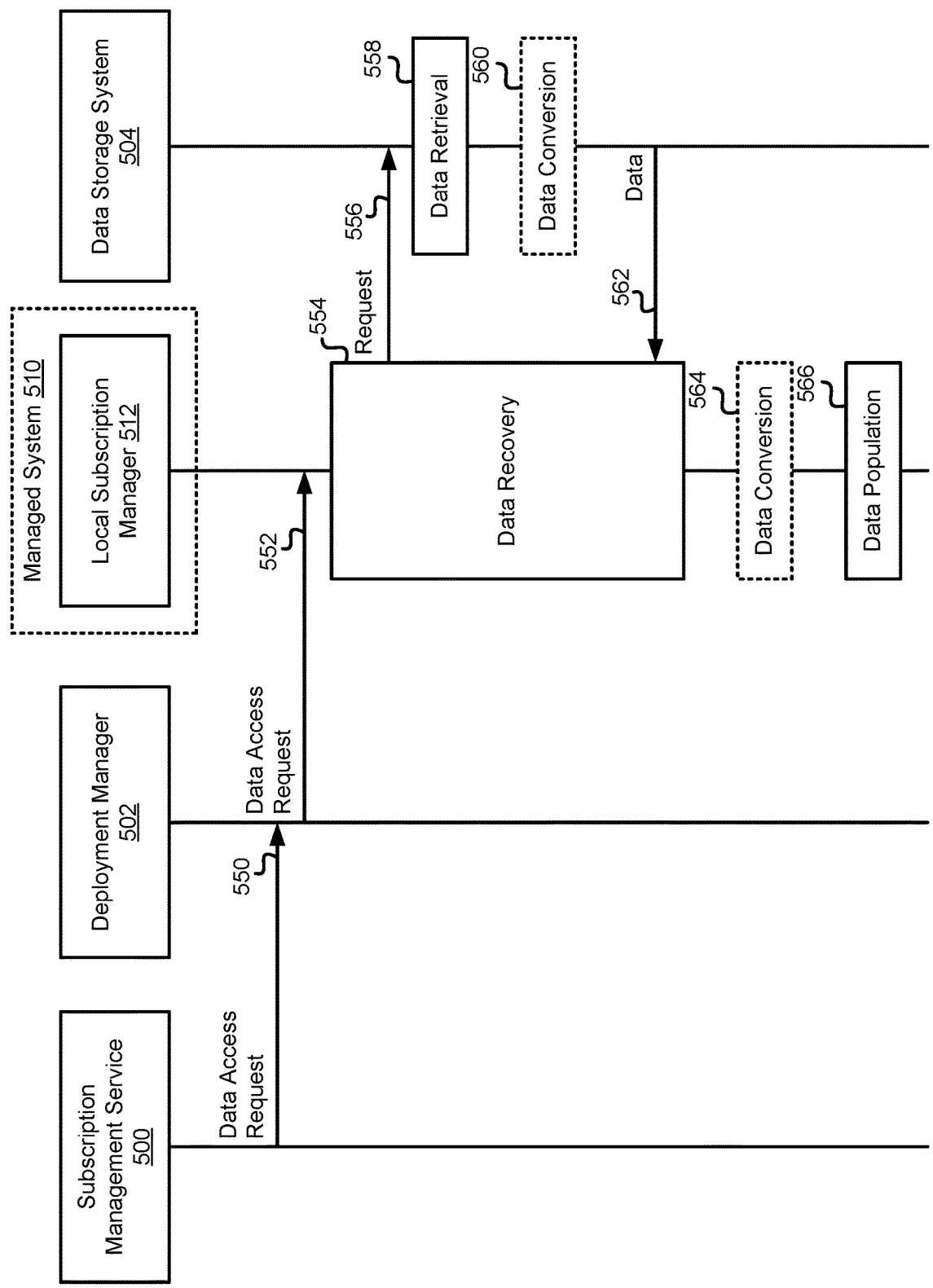

Turning to FIGS. 5A-5B, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Turning to FIG. 5A, an interaction diagram illustrating a process of providing subscription based solutions in accordance with an embodiment is shown. In FIG. 5A, subscription management service 500 may manage a deployment including deployment manager 502 and managed system 510. These components may utilize data storage system 504 as part of their operation when solution changes are implemented. Subscription management service 500, deployment manager, and local subscription manager 512 hosted by managed system 510 may operate as a distributed system that manages provisioning of solutions using managed system 510. The distributed system may be capable of providing such functionality even while various components of the system may be unable to communicate with one another.

At block 520, subscription management service 500 sends a solution disablement request to deployment manager 502. Based on the request, deployment manager 502, at block 522, may generate and send a subscription update to local subscription manager 512 of managed system 510 to initiate a change in the configuration of managed system 510 to terminate a solution specified by the solution change request that is currently being provided with managed system 510. The subscription update may indicate changes (modifications, replacement, etc.) to a startup manager, operation manager, software stack, and/or solution data of managed system 510.

Local subscription manager 512 may treat reception of the subscription update as a subscription termination event. However, it should be understood that the subsequent blocks (e.g., 524 onward) may be performed when other types of subscription termination events are encountered such as a subscription limit being exceeded.

At block 524, local subscription manager 512 performs a data retention process based on the subscription update indicating that the solution data associated with the to-be-terminated solution is to be retained.

As part of the data retention, at block 526, local subscription manager 512 initiates sending of data corresponding to the solution data to data storage system 504. The data may allow for the solution data to be recovered. At block 528, data storage system 504 performs data storage for the received data such that the data is accessible in the future.

After performing the data retention, at block 530, local subscription manager 512 sends a disablement acknowledgement to deployment manager 502 to indicate that the solution is being disabled in accordance with the subscription update of block 522. At block 532, deployment manager 502 sends a disablement acknowledgement to subscription management service 500 to notify it that the process of disabling the solution indicated by the disablement request of block 520 is being performed but is not yet completed.

At block 534, local subscription manager 510 performs an existing solution disablement for the solution by terminating the subscriptions indicated by the subjection update of block 522. To do so, local subscription manager 512 may push any number of code blocks to managed system 510, which may execute the pushed code blocks. Performance of the code blocks may cause managed system 510 to disable the solution functionality and thereby conform itself to the subscriptions enforced by local subscription manager 512.

At block 536, local subscription manager 512 sends a subscription update to deployment manager 502 indicating that managed system 510 is operating in accordance with the live subscriptions and no longer is able to provide the functionality associated with the solution disablement request of block 520. At block 538, deployment manager 502 sends the subscription update to subscription management service 500 thereby notifying subscription management service 500 that the disablement request of block 520 has been serviced.

At block 540, managed system 510 may begin operation. However, by virtue of the existing solution disablement of block 534, managed system 510 may not have access to solution data and may not include functionality to use it in the format in which it was used prior to the existing solution disablement. For example, the application natively used by managed system 510 to read the solution data may no longer be hosted by managed system 510. As such, managed system 510 may be unable to use the solution data, even though it has been retained.

Turning to FIG. 5B, now consider a scenario where a user of managed system 510 needs to access the solution data. To do so, the user may send a request to subscription management service 500 to have the retained solution data be made available through managed system 510.

At block 550, subscription management service 500 sends a data access request to deployment manager 502. The deployment access request may indicate that the solution data is to be made available to users of managed system 510. At block 552, deployment manager 502 may relay the request to local subscription manager 512.

In response to receiving the data access request, at block 554, local subscription manager 512 initiates a data recovery for managed system 510. As part of that process, at block 556, local subscription manager sends a request to data storage system 504 for the solution data. In response to the request, at block 558, data storage system 504 performs a data retrieval for the solution data. As part of the retrieval and eventual population to managed system 510, data storage system 504, local subscription manager 512, and/or managed system 510 may perform data conversion 560 or 564 to modify the format of the solution data to match that compatible with the changed functionality of managed system 510.

At block 562, data storage system 504 sends the retrieved solution data (in original or modified format) to managed system 510. At block 566, managed system 510 performs a data population for the solution data by storing it in a local storage and/or directing various applications hosted by managed system 510 to begin to utilize the solution data.

Thus, via the processes illustrated in FIGS. 5A-5B, embodiments disclosed herein may facilitate the automatic deployment solutions in accordance with a subscription model. For example, embodiments disclosed herein may provide for the automated changes of solutions using managed systems while enabling the solutions to be terminated when subscriptions for the solutions are exceeded.

For example, the registered solutions with the local subscription manager 512 may allow for the independent termination of the solutions in accordance with subscriptions while also ensuring that only use of the solution by the user is available while the solution is actually being provided (as opposed to during periods of time when reconfigurations or modifications are being performed to conform operation of managed system to provide desired/subscribed solutions).

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities with very limited operations for changes in functionality and/or may implement multiple layers of security.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving resilience to malware or other types of third party attacks while still providing for configurability over time such that various types of desired solutions may be provided over time.

As discussed above, various components may be implemented with computing devices. For example, any of the components illustrated in FIGS. 1A-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for providing a solution using managed systems, the method comprising:
    identifying, by a local subscription manager hosted by a managed system of the managed systems, a subscription termination event for the managed system, the subscription termination event indicating that the managed system is no longer subscribed to the solution;
    based on the identification:
        performing, by the local subscription manager, one or more subscription disablement actions, wherein the performance of the one or more subscription disablement actions enforces an operating state on the managed system in which the solution is not performable and wherein the performance of the one or more subscription disablement actions comprises:
            after storing the copy, reformatting the storage device of the managed system, the portion of the solution data being deleted from the reformatted storage device,
            wherein the retention area within the managed system is a protected partition of the managed system that is configured to not be impacted by the one or more subscription disablement actions;
        deregistering, by the local subscription manager, one or more subscriptions associated with the managed system both locally and remotely with a subscription management services that manages the managed system; and
        providing, by the managed system, computer implemented services that are unable to provide the solution,
    wherein performing the one or more subscription disablement actions further comprises, by the local subscription manager:
        making a determination that a portion of solution data stored in a storage device of the managed system subject to a retention requirement; and
        based on determination, storing a copy of the portion of solution data in a retention area configured within the managed system.

2. The computer-implemented method of claim 1, wherein identifying the subscription termination event comprises:
    monitoring operation of the managed system;
    making a comparison between the operation of the managed system and a subscription limitation of a subscription for the solution; and
    making a determination, based on the comparison, that the subscription limitation has been exceeded.

3. The computer-implemented method of claim 2, wherein the comparison is made using a locally maintained copy of the subscription limitation in a storage of the local subscription manager.

4. The computer-implemented method of claim 3, wherein performing the one or more subscription disablement actions comprises:
    retrieving, from the storage of the local subscription manager, a code block associated with the subscription limitation; and
    initiating execution of the code block by a processor of the managed system.

5. The computer-implemented method of claim 4, wherein executing the code block causes the processor to initiate replacement of a startup manager of the managed system with a second startup manager, the second startup manager not being associated with the solution.

6. The computer-implemented method of claim 5, wherein the startup manager is replaced by reconfiguring the startup manager, the reconfigured startup manager being the second startup manager.

7. The computer-implemented method of claim 5, wherein the second startup manager is adapted to display an indication to a user of the managed system that the managed system is unable to provide the solution, the display being associated with a modified personality of the startup manager.

8. The computer-implemented method of claim 5, wherein executing the code block further causes the processor to initiate replacement of an operation manager of the managed system with a second operation manager, the second operation manager not being associated with the solution, and operational management of the managed system being handed off to the second operation manager following startups managed by the second startup manager.

9. The computer-implemented method of claim 1, further comprising:
    prior to performing the computer implemented services:
        installing, with the reformatted storage disk, at least one of a startup manager, an operation manager, and a software stack for the managed system; and
        importing the portion of the solution data from the retention area for use with the computer implemented services,
    wherein the protected partition is configured within a storage of the local subscription manager hosted by the managed system.

10. The computer-implemented method of claim 9, wherein importing the portion of the solution data comprises:
    identifying a destination format compatible with the at least one of the startup manager, the operation manager, and the software stack;
    storing a format modified copy of the portion of the solution data in the storage device based on the destination format; and
    initiating use of the format modified copy of the portion of the solution data by the at least one of the startup manager, the operation manager, and the software stack.

11. The computer-implemented method of claim 9, wherein the local subscription manager comprises a computing device hosted by the managed system and that operates independently from the managed system, the local subscription manager being operably connected to a processor of the managed system used to provide the computer implemented services and the storage device.

12. A non-transitory machine-readable medium having instructions stored therein, which when executed by a processor, cause the processor to perform operations for providing a solution using managed systems, the operations comprising:
identifying, by a local subscription manager hosted by a managed system of the managed systems, a subscription termination event for the managed system, the subscription termination event indicating that the managed system is no longer subscribed to the solution;
based on the identification:
performing, by the local subscription manager, one or more subscription disablement actions, wherein the performance of the one or more subscription disablement actions enforces an operating state on the managed system in which the solution is not performable and wherein the performance of the one or more subscription disablement actions comprises:
after storing the copy, reformatting the storage device of the managed system, the portion of the solution data being deleted from the reformatted storage device,
wherein the retention area within the managed system is a protected partition of the managed system that is configured to not be impacted by the one or more subscription disablement actions;
deregistering, by the local subscription manager, one or more subscriptions associated with the managed system both locally and remotely with a subscription management services that manages the managed system; and
providing, by the managed system, computer implemented services that are unable to provide the solution,
wherein performing the one or more subscription disablement actions further comprises, by the local subscription manager:
making a determination that a portion of solution data stored in a storage device of the managed system subject to a retention requirement; and
based on determination, storing a copy of the portion of solution data in a retention area configured within the managed system.

13. The non-transitory machine-readable medium of claim 12, wherein identifying the subscription termination event comprises:
monitoring operation of the managed system;
making a comparison between the operation of the managed system and a subscription limitation of a subscription for the solution; and
making a determination, based on the comparison, that the subscription limitation has been exceeded.

14. The non-transitory machine-readable medium of claim 13, wherein the comparison is made using a locally maintained copy of the subscription limitation in a storage of the local subscription manager.

15. The non-transitory machine-readable medium of claim 14, wherein performing the one or more subscription disablement actions comprises:
retrieving, from the storage of the local subscription manager, a code block associated with the subscription limitation; and
initiating execution of the code block by a processor of the managed system.

16. A managed system, comprising:
a processor; and
a local subscription manager adapted to perform operations for managing a solution provided by the managed system, the operations comprising:
identifying, by a local subscription manager hosted by a managed system of the managed systems, a subscription termination event for the managed system, the subscription termination event indicating that the managed system is no longer subscribed to the solution;
based on the identification:
performing, by the local subscription manager, one or more subscription disablement actions, wherein the performance of the one or more subscription disablement actions enforces an operating state on the managed system in which the solution is not performable and wherein the performance of the one or more subscription disablement actions comprises:
after storing the copy, reformatting the storage device of the managed system, the portion of the solution data being deleted from the reformatted storage device,
wherein the retention area within the managed system is a protected partition of the managed system that is configured to not be impacted by the one or more subscription disablement actions;
deregistering, by the local subscription manager, one or more subscriptions associated with the managed system both locally and remotely with a subscription management services that manages the managed system; and
providing, by the managed system, computer implemented services that are unable to provide the solution,
wherein performing the one or more subscription disablement actions further comprises, by the local subscription manager:
making a determination that a portion of solution data stored in a storage device of the managed system subject to a retention requirement; and
based on determination, storing, a copy of the portion of solution data in a retention area configured within the managed system.

17. The managed system of claim 16, wherein identifying the subscription termination event comprises:
monitoring operation of the managed system;
making a comparison between the operation of the managed system and a subscription limitation of a subscription for the solution; and
making a determination, based on the comparison, that the subscription limitation has been exceeded.

18. The managed system of claim 17, wherein the comparison is made using a locally maintained copy of the subscription limitation in a storage of the local subscription manager.

19. The managed system of claim 18, wherein performing the one or more subscription disablement actions comprises:
retrieving, from the storage of the local subscription manager, a code block associated with the subscription limitation; and initiating execution of the code block by a processor of the managed system.

\* \* \* \* \*